United States Patent
Huber

(10) Patent No.: US 11,174,101 B2
(45) Date of Patent: Nov. 16, 2021

(54) METHOD FOR THE DESTRUCTION OF DATA CARRIERS, COLLECTION VEHICLE AND USE OF A PULPER

(71) Applicant: RHENUS DATA OFFICE AG, Basel (CH)

(72) Inventor: Michael Jörg Huber, Hinwil (CH)

(73) Assignee: RHENUS DATA OFFICE AG, Basel (CH)

(*) Notice: Subject to any disclaimer, the term of this patent is extended or adjusted under 35 U.S.C. 154(b) by 1258 days.

(21) Appl. No.: 15/116,351

(22) PCT Filed: Feb. 6, 2014

(86) PCT No.: PCT/EP2014/052329
§ 371 (c)(1),
(2) Date: Aug. 3, 2016

(87) PCT Pub. No.: WO2014/131593
PCT Pub. Date: Sep. 4, 2014

(65) Prior Publication Data
US 2016/0355336 A1   Dec. 8, 2016

(51) Int. Cl.
*B65F 3/14* (2006.01)
*B65F 3/00* (2006.01)
(Continued)

(52) U.S. Cl.
CPC .............. *B65F 3/14* (2013.01); *B02C 21/026* (2013.01); *B02C 23/36* (2013.01); *B65F 1/127* (2013.01);
(Continued)

(58) Field of Classification Search
CPC ... B02C 18/0007; B02C 21/02; B02C 21/026; B02C 23/36; B65F 3/00; B65F 3/14
(Continued)

(56) References Cited

U.S. PATENT DOCUMENTS 4,082,672 A * 4/1978 Petroski .................... B60P 1/60
                                                    210/205
4,219,381 A * 8/1980 Schnell ................... B03B 9/061
                                                      162/9
(Continued)

FOREIGN PATENT DOCUMENTS

DE    28 18 779 A1    9/1979
DE    38 77 028 T2    4/1993
(Continued)

OTHER PUBLICATIONS

English translate (EP1476376B1), retried date Jul. 13, 202.*
(Continued)

*Primary Examiner* — Adam J Eiseman
*Assistant Examiner* — Mohammed S. Alawadi
(74) *Attorney, Agent, or Firm* — Paul D. Bianco; Stephen Bongini; Fleit Intellectual Property Law

(57) ABSTRACT

A method for the destruction of data carriers preventing access to the process of rendering confidential data carriers, which consist of paper or similar material, unreadable and allowing the carriers to be destroyed. In the method, confidential data carriers are collected at the point of origin in secure collection containers, removed by a collection vehicle, and are supplied to a paper recycling plant in a final step. The interior of a mobile pulper, which is connected to the collection vehicle, is filled with the confidential data carriers, the carriers are mixed with a pulping fluid and the mixture is blended by an agitator to form a suspension of defibrated documents and pulping fluid, a hydromechanical pulping process taking place in the pulper before the suspension is supplied to the paper recycling plant.

21 Claims, 2 Drawing Sheets

(51) Int. Cl.
*B02C 21/02* (2006.01)
*B02C 23/36* (2006.01)
*B65F 1/12* (2006.01)
*B65F 3/02* (2006.01)
*D21B 1/32* (2006.01)
*D21B 1/34* (2006.01)
*B65F 9/00* (2006.01)

(52) U.S. Cl.
CPC ............... *B65F 3/00* (2013.01); *B65F 3/02* (2013.01); *B65F 9/00* (2013.01); *D21B 1/32* (2013.01); *D21B 1/345* (2013.01); *B65F 2003/006* (2013.01); *B65F 2210/169* (2013.01); *B65F 2240/1562* (2013.01); *Y02W 30/64* (2015.05)

(58) Field of Classification Search
USPC .................. 241/21, 24.19, 101.741, 236
See application file for complete search history.

(56) References Cited

U.S. PATENT DOCUMENTS

| | | | | |
|---|---|---|---|---|
| 4,865,690 | A | | 9/1989 | Bernard et al. |
| 5,186,397 | A | * | 2/1993 | Orlando ............ B02C 19/0075 100/100 |
| 5,542,617 | A | * | 8/1996 | Rajewski ............ B02C 13/04 241/101.761 |
| 6,540,871 | B1 | * | 4/2003 | Rumph ............ D21C 11/0007 162/16 |
| 6,588,691 | B2 | * | 7/2003 | Yamamoto ............ B65F 3/08 241/101.74 |
| 6,719,226 | B2 | * | 4/2004 | Rajewski ............ B02C 13/04 241/101.741 |
| 7,980,497 | B2 | | 7/2011 | Mueller et al. |
| 8,028,941 | B2 | | 10/2011 | Iwashige |
| 8,882,008 | B1 | * | 11/2014 | Viveen ............ B02C 18/0007 241/29 |
| 2002/0017577 | A1 | * | 2/2002 | Rajewski ............ B02C 18/0007 241/30 |
| 2003/0042343 | A1 | * | 3/2003 | Yamamoto ............ B65F 3/22 241/101.3 |
| 2005/0051650 | A1 | * | 3/2005 | Watanabe ............ B02C 18/0007 241/101.741 |
| 2006/0032956 | A1 | * | 2/2006 | Rajewski ............ B02C 18/0007 241/101.74 |
| 2006/0032957 | A1 | * | 2/2006 | Bet ............ B02C 18/0007 241/101.74 |
| 2006/0118667 | A1 | * | 6/2006 | Yamada ............ D21B 1/32 241/46.17 |
| 2008/0173416 | A1 | * | 7/2008 | Tamai ............ D21B 1/32 162/62 |
| 2009/0065616 | A1 | * | 3/2009 | Walsh ............ B02C 18/0007 241/33 |
| 2009/0256375 | A1 | * | 10/2009 | Haskins ............ B60P 3/14 296/24.32 |
| 2010/0050887 | A1 | * | 3/2010 | Freda ............ B02C 18/0007 100/98 R |
| 2010/0102126 | A1 | * | 4/2010 | Benson ............ G07F 17/12 235/381 |
| 2011/0240778 | A1 | * | 10/2011 | Yamamoto ............ B65F 3/08 241/101.71 |
| 2012/0247984 | A1 | * | 10/2012 | Jansson ............ B02C 18/0007 206/216 |
| 2013/0259614 | A1 | * | 10/2013 | Vasilescu ............ B65F 3/02 414/406 |

FOREIGN PATENT DOCUMENTS

| | | | | |
|---|---|---|---|---|
| DE | 4141865 | | 6/1993 | |
| DE | 100 41 765 | A1 | 5/2001 | |
| EP | 1048352 | | 11/2000 | |
| EP | 1048352 | A1 * | 11/2000 | ......... B02C 18/0007 |
| EP | 1476376 | A1 * | 11/2004 | ......... B65F 1/10 |
| EP | 1048352 | B1 * | 12/2005 | ......... B30B 9/3035 |
| EP | 1679403 | A1 | 7/2006 | |
| EP | 1731663 | A1 | 12/2006 | |
| EP | 1476376 | | 1/2008 | |
| EP | 1476376 | B1 * | 1/2008 | ......... B65F 3/12 |
| EP | 1947236 | | 7/2008 | |
| EP | 2122047 | B1 | 11/2009 | |
| EP | 2758588 | B2 | 7/2014 | |
| GB | 2472409 | A * | 5/2008 | |
| WO | 0170406 | | 9/2001 | |
| WO | 03070606 | | 8/2003 | |

OTHER PUBLICATIONS

English translate (EP1048352B1), retried date Jul. 14, 202.*
International Search Report dated Mar. 28, 2014 for PCT/EP2014/052329, filed Feb. 6, 2014.
English translation of International Preliminary Examination Report with Written Opinion, dated Aug. 9, 2016 for PCT/EP2014/052329, filed Feb. 6, 2014.
Opposition Invitation for European Patent Application No. 14702877.3-1016/3102508 dated Mar. 30, 2021 with English translation.

* cited by examiner

METHOD FOR THE DESTRUCTION OF DATA CARRIERS, COLLECTION VEHICLE AND USE OF A PULPER

TECHNICAL FIELD

The present invention describes a data carrier destruction method for rendering confidential data carriers of paper and likewise unreadable and for their destruction, in a manner safeguarded from access, wherein confidential data carriers are collected at a location of origin in security collection containers, are collected by way of a collection vehicle and finally led to a paper recycling facility, a collection vehicle for picking up and transporting confidential data carriers of paper and likewise, which are collected in security collection containers, for carrying out a data carrier destruction method, as well as the use of a disintegration device for the hydromechanical treatment of confidential data carriers in the form of paper and likewise.

STATE OF THE ART

Despite the fact that much information is exchanged in an electronic manner nowadays, huge quantities of confidential documents and data carriers, in the form of papers or information carriers of paper or similar material of cellulose or wood pulp still however continue to accumulate in companies, but also in the private sphere. A discrete disposal is of utmost importance in many fields, in the case that these confidential data carriers are no longer required. A disposal which is safeguarded against access by unauthorised third parties has been achieved in recent years by way of various document destruction methods.

In the simplest case, the confidential documents can be reduced in size into shreds directly on location in offices by way of electromechanical shredding facilities, and thus reduced in size to the extent that they are difficult to be reconstructed. However, with such a procedure, one cannot completely prevent unauthorised persons obtaining access to the confidential document before the shredding process. Correspondingly many shredding appliances are to be procured, depending on the quantity of confidential documents to be destroyed, by which means the access possibilities by third parties are widened to each in shredding facility. The shred size which can be achieved with the obtainable shredding appliances however does not often correspond to the security level which is required in accordance with the confidentiality. Data carriers can also be reconstructed after the shredding due to this.

A document destruction method of the applicant is known from EP1476376, and this renders an access impossible during the complete procedure and is implemented in a centralised manner. Confidential documents in an office are collected at a central location in a security collection container. The confidential documents are inserted into the security collection container through an insert opening and thereafter can no longer be removed from the sealed and electronically secured security collection container. An undesired access to confidential data carriers can be ruled out, since access obstacles are arranged at the insert opening of the security collection container, and the opening mechanism can only be opened by electronic means. The security collection container is part of a disposal system, in which filled security collection containers are collected which is to say fetched, and exchanged with empty security collection containers. The security collection containers are emptied on location at the customer, into a container of a collection vehicle, likewise in a secured manner, wherein the container can electronically open the opening mechanism of the security collection container in a manner such that an access by third parties is also prevented with the filling transfer of the confidential documents. Means are provided for the blanket surveillance of the transport and each opening of the security collection container, so that the safeguarding from access is protocolled.

Of course, the container of the collection vehicle also permits no access into its interior, so that a complete safeguarding of the confidential documents from unauthorised access is ensured during the complete destruction process. The collected confidential documents are transported by the collection vehicle to a central disposal facility, usually a certified shredding facility, where these document are reduced in size according to an as high as possible security level, such that the resulting snippets are suitable for paper recycling. Nobody has access to the confidential documents to be shredded, even on ejecting the collected documents out of the container of the collection vehicle into the shredding facility. Surveillance also takes place on ejecting the documents to be destroyed, by which means an unauthorised access safeguard can be confirmed here too. After treatment in the shredding facility, the shreds are conveyed to a paper recycling facility and can be recycled there. This process is represented schematically in FIG. 3. The possibility of confidential documents getting lost exists, for example in the case of an accident of the collection vehicle on the way to the certified shredding facility 5, due to the fact that the collected confidential documents, after collection at a location of origin A, are not destroyed until in this facility.

Now it is possible to provide the collection vehicles with shredding facilities, by which means a so-called mobile shredding can be implemented. Such a system is known for example from WO0170406. The confidential, still readable data carriers collected in the security collection containers can be shredded on location on the collection vehicle after the secured transfer into the container, and be reduced in size according to a define security level, wherein an unauthorised access can likewise be prevented. The on-location shredding however has some disadvantages.

Particularly powerful cutting mechanisms are to be applied, so that the occurring, differently thick paper types and confidential documents which occur in the most varied of formats can be reduced in size and shredded according to a medium security level. If the size reduction is to be effected with a cross-cut or particle-cut, then such shredding appliances have a loud operating noise, as is known. The applied cutting mechanisms are complex and must be supplied with sufficient energy, in order for a trouble-free size reduction of completely filled security collection containers to be able to be carried out. The shredding appliance must be operated over a longer period of time, with a running motor or engine of the collection vehicle for this. In practise, the power capability of the shredding appliances is not sufficient to be able to reduce in size the fed quantity of confidential data carriers within a short period of time and according to a high security level. It is difficult to commercially and successfully reduce in size the payload quantity of confidential data carriers due to the high intrinsic weight and volume of the shredding appliance. For security reasons and so as to be able to transfer the produced shreds to the paper recycling, the confidential data carriers shredded in a mobile manner must be transported to a certified shredding facility and be post-shredded there once again, before they can be transported into a paper recycling facility for recycling.

DESCRIPTION OF THE INVENTION

Some embodiments of the invention provide a data carrier destruction method which prevents access to confidential documents of paper and likewise and includes a destruction step already during the collection of the documents, wherein the possible feed of the destroyed documents to paper recycling remains ensured, and one forgoes the additional treatment in a shredding facility.

The data carrier destruction method for this only entails a slight increase in effort with regard to apparatus, compared to disposal systems according to the state of the art.

Some embodiments of the present data carrier destruction method are the implementation of a processing step on location at a location of origin and/or during the transport of the collected documents from the location of origin to a paper recycling facility, wherein the access to the collected, confidential documents is rendered impossible at all times.

Some embodiments of the invention are the creation of a collection vehicle for the mobile implementation of a data carrier destruction method.

The advantages which can be attained by the method according to the invention, apart from the destruction with an as high as possible security level, wherein one can achieve the absolute impossibility of being able to reconstruct the confidential data carriers, is additionally the improved retention of the length of the paper fibres due to the tearing, instead of the cutting as occurs when shredding.

The diversion of the collected, confidential data carriers via a certified shredding facility on the way to a paper recycling facility can finally be avoided. The total investment can be significantly reduced in comparison to mobile shredding facilities, and the energy expense on location for the destruction of the data carriers is significantly lower according to the method according to the invention, than with known mobile shredding methods.

BRIEF DESCRIPTION OF THE DRAWING

A preferred embodiment example of the subject-matter of the invention is described hereinafter in combination with the accompanying drawings.

DESCRIPTION

Figure 1:
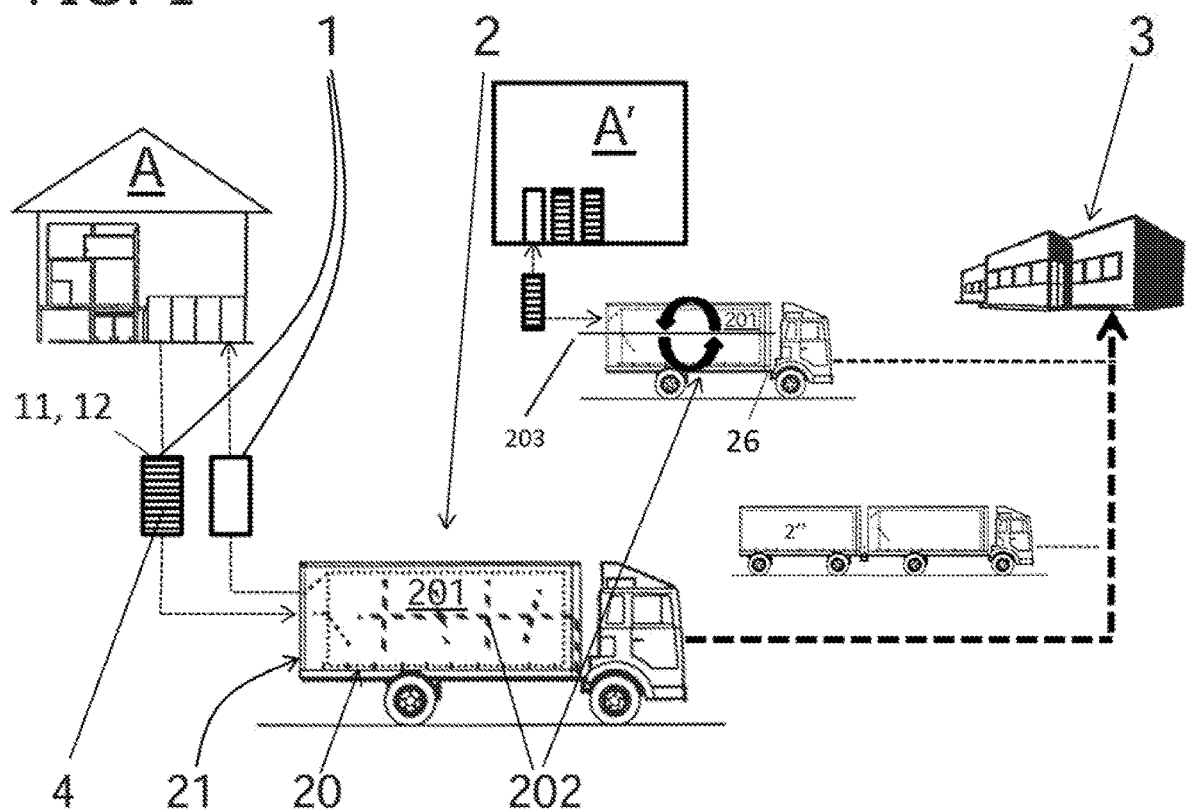
FIG. 1 shows a schematic view of the data carrier destruction method from the location of origin, the filling transfer of the confidential data carriers and the transport up to delivery in a paper recycling facility.

The data carrier destruction method for the destruction of confidential, personal and/or sensitive documents and data carriers 4, in the form of papers or information carriers of paper or similar material of cellulose or wood pump, which is to say for rendering all these unreadable, is schematically represented in FIG. 1.

The confidential data carriers 4 which are be destroyed are collected in closed security collection containers 1 at a location of origin A. Third parties have no access to the data carriers 4 after the input of the confidential data carriers 4 into the security collection container 1. The security collection containers 1 which are filled which collected documents and data carriers 4 are transferred by filling into a collection vehicle 2, wherein emptied security collection containers 1 are again returned back to the location of origin A.

A disintegration device 20, also called pulper 20, which comprises a trough having an interior 201 is located on the collection vehicle. The disintegration device 20 is coupled to a loading device 21, by way of which the contents of the security collection containers 1 can be filled by transfer into the interior 201 of the disintegration device 20, securely and without access to unauthorised persons. The loading device 21 can be designed as a lift or lift-and-rotate tipper which lifts the security collection containers 1 vertically relative to the disintegration device 20. Such a lift can be carried along with the disintegration device 20 and thus with the collection vehicle 2.

A circulation device 202 is provided, which circulates the mass of filled-in, confidential data carriers 4 which is located in the interior 210. The circulation device 202 is designed as a stirrer in FIG. 1 and is arranged in the interior 201.

A disintegration fluid, as a rule pure water, which is mixed with the data carriers 4, is filled into the interior 201. The confidential documents 4 in the interior 201 are brought into a suspension, which has a mud-like consistency, depending on the mixing ratio of the disintegration fluid to the quantity of documents. The disintegration fluid can selectively contain defribration-assisting chemicals. A mechanical defibration (disintegration) of the confidential data carriers 4 takes place in the disintegration device 20, due to the circulation device 202, wherein a hydromechanical defibration takes place in the interior 201 of the disintegration device 20 by way of the addition of the disintegration fluid.

The confidential data carriers 4 become unreadable and are already disintegrated into fibres within a few minutes, on account of the circulation of the filled-in data carriers 4 amid the action of the disintegration fluid. The confidential documents 4 are rendered unreadable in a targeted manner with this defibration, and are thus destroyed, wherein the resulting fibre length remains significantly larger than is the case after undergoing a shredding process. A destruction of the data carriers 4 according to the security level several is rendered possible with the described method due to the treatment in the interior 201 of the disintegration device 20, so that the reproduction of the data located on the confidential data carriers 4, according to the state of the science and the state of the art is impossible, in accordance with DIN standard 66399.

The disintegration or defibration of the confidential documents 4 in the disintegration device 20 represents the rendering of the data unreadable and simultaneously a recycling step of the paper and this takes place directly after filling into the disintegration device 20. The disintegration process takes place within a few minutes due to the intrinsic friction and tearing at the circulation device 202, of the confidential documents 4 with the disintegration fluid. The destruction of the confidential documents 4 which can be achieved by way of this take place immediately after filling into the interior 201 of the disintegration device 20, wherein only a low energy effort needs to be expended for the one-off loading and the circulation which is carried out at least briefly. Accordingly, the disintegration process can continue to take its course whilst the collection vehicle 2 moves. The arising suspension of defibrated documents and disintegration fluid is moved during the journey even if the circulation device 202 is switched off, by which means a continuous mobile defibration is achieved.

The collection vehicle 2 transports the suspension of defibrated documents and disintegration fluid into a paper recycling facility 3, in which the destroyed documents can be recycled for the production of paper. A transport to a certified shredding facility can be done away with on account of the mobile disintegration of the confidential documents 4. The collected confidential documents 4 are present in a destroyed form according to a high security level and are already in a recyclable form.

The confidential documents 4 are unreadable and therefore destroyed, even if an undesired opening of the interior 201 and exit of the suspension should occur on the transport route of the collection vehicle 2 to the paper recycling facility 3.

The disintegration device 20 can be installed on the loading surface of the collection vehicle 2 in a fixed manner or can be carried along on a trailer 2", coupled to the collection vehicle 2. The disintegration device 20 can be arranged in a rotatable manner about a longitudinal axis 203, so that the circulation device 202 is accordingly designed as a disintegration device rotatable about the longitudinal axis 203. In a further embodiment, the circulation device can be designed as a rotor which is installed in the interior 201. All possible circulation devices 202 accordingly require a circulation device drive 26 which drives the circulation of the suspension in the interior 201. This circulation device drive 26 is usefully connected to the drive of the collection vehicle 2.

In a further embodiment, the interior 201 of the disintegration device 20 can be filled with a constant quantity of disintegration fluid before starting the collection route of the collection vehicle 2, wherein loaded data carriers 4 are simply added to the already existing suspension or to the quantity of disintegration fluid.

Security collection containers 1 as are already described in EP1476376 of the applicant can be applied, in order to prevent access by unauthorised persons to the confidential data carriers 4. Thereby, the security collection containers 1 are completely closed and comprise an insert slot which by way of obstacles arranged in the interior of the security collection container 1 prevents confidential data carriers 4 from being able to be removed. An ejection flap 12 is provided with an electromechanical closure 11. This electromechanical closure 11 can be opened by way of suitable electronics, by way of which the ejection flap 12 can be opened and the confidential data carriers 4 transferred by filling directly into the disintegration device 20. It is particularly advantageous if the ejection flap 12 of the security collection container 1 is actively connectable to the filling opening of the disintegration device 20, so that a filling transfer can be achieved in a manner safeguarded from access.

Additional means are provided, which co-protocol the transport route of the security collection container 1, for example by way of GPS tracking, and each opening of the ejection flap 12. The movement of the security collection container 1 can be completely recorded, and it can be proven that no undesired opening by unauthorised parties has taken place, on account of this.

The collection vehicle 2 can be designed as a tipper, by which means, given a disintegration device 20 fastened thereon, a simplified emptying of the contents from the interior 201 into the paper recycling facility 3 is rendered possible.

The collection vehicle 2 can also be designed in a manner such that the disintegration device 20 is fastened on a trailer 2", which is carried along by the collection vehicle 2. Here too, the disintegration device 20 can also be designed fastened in a tippable manner.

The contents of the disintegration device 20 after the disintegration procedure, can also be removed from the interior 201 by suitable pump means, above all if the disintegration device 20 is fastened on the collection vehicle 2 in a stationary manner. The pump means can thereby either be fixedly connected to the collection vehicle 2 and/or to the trailer 2" and be designed such that they can also be carried along, or the pump means are installed at the paper recycling facility 3.

Trials have found that a mass share of the disintegration fluid of already at least 20% to the mass of the suspension leads to good destruction results. The use of 85% to 98% disintegration fluid to 15% to 2% solid manner which is to say data carrier quantity however is more preferable when using a disintegration device 20. A metering device is provided, in order to add the disintegration fluid to the quantity of inputted data carriers 4 in a targeted manner. The mass of loaded data carriers 4 is determined by a weighing device of the loading device 21, and the desired of quantity of disintegration fluid is added in a manner matched to this, by way of a metering device.

Figure 2:
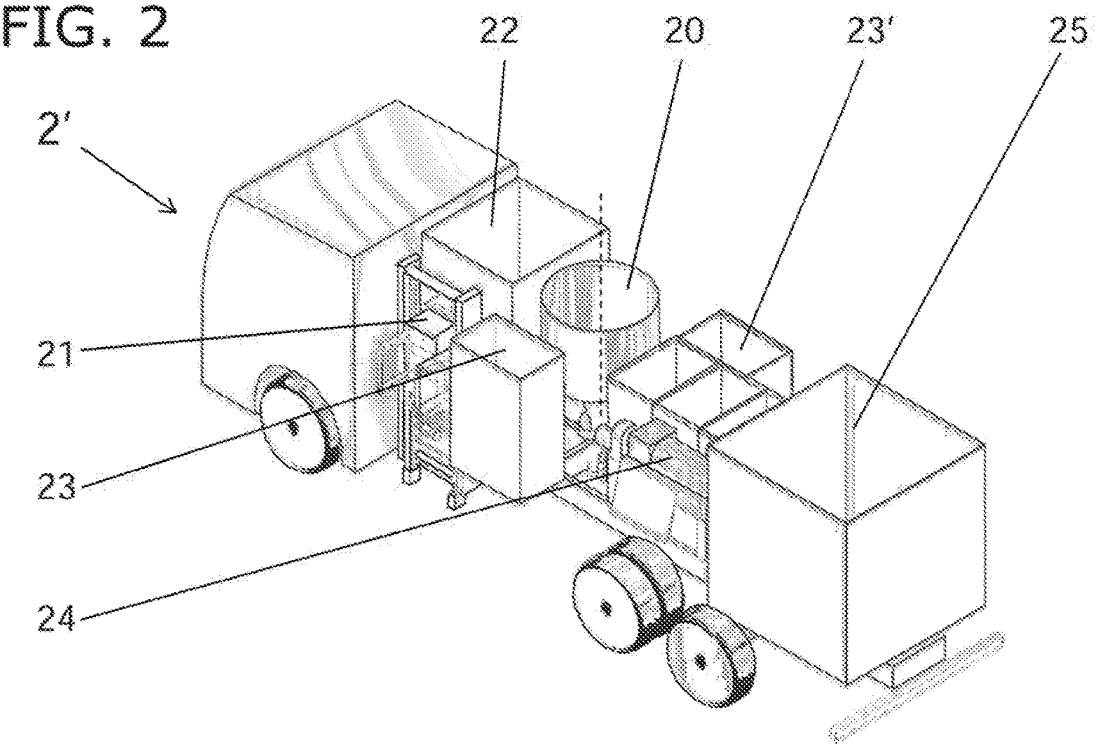
FIG. 2 shows a perspective view of an embodiment of a collection vehicle for collection, for transport and for the destruction of confidential data carriers.
Figure 3:
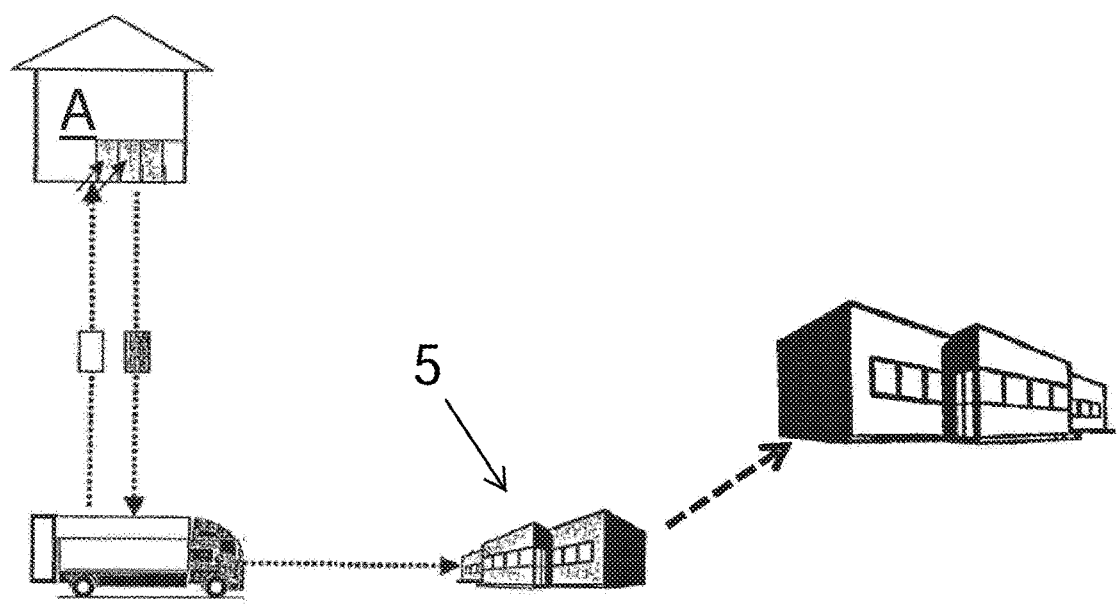
FIG. 3 shows a schematic view of the procedure of a data carrier destruction method according to the state of the art, wherein collected confidential data carriers are delivered with and without mobile shredding, to a paper recycling facility via a certified shredding facility

As to how an embodiment of the collection vehicle 2' can look, is described hereinafter by way of FIG. 2. The collection vehicle 2' comprises a loading device 21, by way of which confidential data carriers 4 which are to be destroyed can be filled from a security collection container 1 into a fill-in space 22. The dry, confidential data carriers 4 are transported from the fill-in space 22 into the disintegration device 20, which here is designed as a vertically standing disintegration device 20, wherein the longitudinal axis 203 or rotation axis of the disintegration device 20 is aligned perpendicularly to the longitudinal axis of the collection vehicle 2'. Water as a disintegration fluid can be pumped out of a carried-along water tank 23 into the disintegration device 20 in a controlled manner by way of pump means. The circulation device which is applied here but which is not visible can be operated at up to 1500 revolutions per minute, wherein the data carriers 4 within the disintegration fluid can be destroyed to an unreadable extent already after a few minutes.

The suspension, comprising 2% to 15% solid matter in the form of defibrated, confidential documents can be transported into a dewatering device 24 by way of further pump means, in which dewatering device disintegration fluid is separated from the suspension, so that a mixing ratio of solid matter to water of about one to one results. Here, a drying worm 24 serving as a dewatering device 24 is applied. The separated disintegration fluid is either re-fed to the water tank 23, a replacement tank 23' or directly to the disintegration device 20. Dewatered suspension which has a significantly higher density than the suspension within the disintegration device 20 can be pumped out of the dewatering device 24 into a storage tank 25. The dewatered suspension has a mud-like form up to the consistency of a moist mass of paper, and is stored in this storage tank 25 during the transport by the collection vehicle 2'.

The collection vehicle 2' can transport the suspension out of the storage tank 25 to the paper recycling facility 43 and be fed to the recycling there, due to the fact that the destroyed data carriers in the suspension are unreadable. However, it is also possible prior to this to intermediately store the suspension for example at the location of the operator of the collection vehicle 2', since the data carriers are no longer readable. The journeys of the collection vehicle 2' to the paper recycling facility 3 can be reduced to a minimum by way of this.

LIST OF REFERENCE NUMERALS

- 1 security collection container
- 2'' trailer
- 2, 2' collection vehicle
  - 20 disintegration device
    - 201 interior
    - 202 circulation device
    - 203 axis
  - 21 loading device
  - 22 fill-in space
  - 23 water tank
  - 23' replacement tank
  - 24 dewatering device
  - 25 storage tank
  - 26 drive
- 3 paper recycling facility
- 4 confidential data carriers
- A location of origin
- 5 shredding facility
- 11 closure mechanism
- 12 ejection flap

The invention claimed is:

1. A confidential data carrier destruction method for rendering confidential data carriers, which are in the form of paper, unreadable and for destruction of the confidential data carriers in a manner safeguarded from access, said method comprising:
    collecting the confidential data carriers at a location of origin in sealed and secured security collection containers so as to prevent access at the location of origin to the confidential data carriers collected in the security collection containers;
    removing the confidential data carriers from the location of origin by a collection vehicle and transporting the confidential data carriers to a paper recycling facility, the removing and transporting including:
        transferring the confidential data carriers from the security collection containers into an interior of a mobile disintegration device connected to the collection vehicle in a manner that is secure and inaccessible to unauthorized persons; and
        during transport from the location of origin to the paper recycling facility, mixing the confidential data carriers in the mobile disintegration device with a disintegration fluid using a circulation device to produce a suspension of defibrated documents and disintegration fluid, a hydromechanical disintegration of the confidential data carriers taking place in the mobile disintegration device during transport so as to render the confidential data carriers unreadable and therefore destroyed; and
    transporting the suspension of defibrated documents and disintegration fluid to the paper recycling facility.

2. The confidential data carrier destruction method according to claim 1, wherein the circulation device is rotatable about a longitudinal axis of the mobile disintegration device.

3. The confidential data carrier destruction method according to claim 1, wherein the circulation device is a stirrer or a rotor which is installed in the interior of the mobile disintegration device.

4. The confidential data carrier destruction method according to claim 1, wherein the suspension has a mass ratio of disintegration fluid to confidential data carriers of from 85/15 to 98/2.

5. The confidential data carrier destruction method according to claim 1, wherein the transferring comprises using a loading device, which is coupled to the mobile disintegration device, to transfer the confidential data carriers from the sealed and secured security collection containers into the interior of the mobile disintegration device in a manner which is secure and inaccessible to unauthorised persons.

6. The confidential data carrier destruction method according to claim 5,
    wherein the security collection containers include an electromechanically operated closure mechanism that secures the security collection containers so as to prevent access to the confidential data carriers collected in the security collection containers, and
    the transferring comprises the loading device electronically opening the closure mechanism and directly transferring the confidential data carriers from the security collection containers into the interior of the mobile disintegration device without allowing access to unauthorised persons.

7. The confidential data carrier destruction method according to claim 5,
    wherein the security collection containers each include an ejection flap having an electromechanically operated closure mechanism that secures the security collection container so as to prevent access to the confidential data carriers collected in the security collection container, and
    the transferring comprises the loading device actively connecting to the ejection flap of the security collection container, and electronically opening the closure mechanism to open the ejection flap such that the confidential data carriers are directly transferred from the security collection container into the interior of the mobile disintegration device without allowing access to unauthorised persons.

8. The confidential data carrier destruction method according to claim 1,
    wherein the mobile disintegration device is installed on a loading surface of the collection vehicle in a fixed manner, and
    during transport from the location of origin to the paper recycling facility, the confidential data carriers are inaccessible.

9. The confidential data carrier destruction method according to claim 1,
    wherein access to the confidential data carriers collected in the sealed and secured security collection containers is prevented by an electromechanically operated closure mechanism, and
    the transferring comprises electronically opening the closure mechanism of the security collection containers so as to transfer the confidential data carriers from the sealed and secure security collection containers into the interior of the mobile disintegration device in a manner that is secure and inaccessible to unauthorized persons.

10. The confidential data carrier destruction method according to claim 1, wherein the mixing comprises adding defibration-assisting chemicals to the interior of the mobile disintegration device.

11. The confidential data carrier destruction method according to claim 1, wherein the mixing comprises using a metering device to add a mass of the disintegration fluid in a controlled manner based on the mass of the confidential data carriers measured by a weighing device, and the mass of the disintegration fluid corresponds to at least one fifth of the mass of the confidential data carriers.

12. The confidential data carrier destruction method according to claim 1, wherein the confidential data carriers are not shredded before the confidential data carriers are mixed with the disintegration fluid using the circulation device.

13. The confidential data carrier destruction method according to claim 1, wherein the mobile disintegration device is fastened on a trailer that is coupled to the collection vehicle.

14. A vehicle for collection and hydromechanical disintegration of confidential data carriers, which are in the form of paper and collected in security collection containers at a location of origin, and for transportation of the confidential data carriers from the location of origin to a paper recycling facility, said vehicle comprising:
- a mobile disintegration device having an interior, the mobile disintegration device being installed on the vehicle in a fixed manner or being fastened on a trailer of the vehicle;
- a loading device coupled to the mobile disintegration device, the loading device transferring the confidential data carriers from the security collection containers, which are sealed and secured so as to prevent access at the location of origin to the confidential data carriers, into the interior of the mobile disintegration device at the location of origin in a manner which is secure and inaccessible to unauthorised persons; and
- a circulation device in the interior of the mobile disintegration device, the circulation device, during transport of the confidential data carriers from the location of origin to the paper recycling facility, mixing the confidential data carriers in the interior of the mobile disintegration device with a disintegration fluid so as to produce a suspension of defibrated documents and disintegration fluid through a hydromechanical disintegration of the confidential data carriers, the circulation device disintegrating the confidential data carriers into fibers during transport so as to render the confidential data carriers unreadable and therefore destroyed.

15. The vehicle according to claim 14, wherein the vehicle is a tipper with the mobile disintegration device tippably installed.

16. The vehicle according to claim 14, wherein the circulation device comprises a stirrer, a rotor, or a device for rotation of the mobile disintegration device about a longitudinal axis.

17. The vehicle according to claim 14, wherein the mobile disintegration device is coupled to a metering device, by which a defined quantity of the disintegration fluid is added to the interior of the mobile disintegration device based on the mass of the confidential data carriers in the interior of the mobile disintegration device.

18. The vehicle according to claim 14, further comprising:
a dewatering device separating some of the disintegration fluid out of the suspension, so as to increase the density of the suspension after the confidential data carriers have been disintegrated into fibers, wherein the dewatering device comprises a drying worm.

19. The vehicle according to claim 14, wherein the loading device electronically opens an electromechanically operated closure mechanism of the security collection containers, and directly transfers the confidential data carriers from the security collection containers into the interior of the mobile disintegration device without allowing access to unauthorised persons, the closure mechanism securing the security collection containers so as to prevent access to the confidential data carriers collected in the security collection containers.

20. A mobile disintegration device for hydromechanical disintegration of confidential data carriers, which are in the form of paper, during transportation of the confidential data carriers from a location of origin to a paper recycling facility, the mobile disintegration device being carried along with a collection vehicle, said mobile disintegration device comprising:
- an interior;
- a loading device transferring the confidential data carriers from security collection containers, which are sealed and secured so as to prevent access at the location of origin to the confidential data carriers, into the interior of the mobile disintegration device at the location of origin in a manner which is secure and inaccessible to unauthorised persons;
- a disintegration fluid mixed with the confidential data carriers in the interior of the mobile disintegration device;
- a circulation device in the interior of the mobile disintegration device, the circulation device, during transport of the confidential data carriers from the location of origin to the paper recycling facility, mixing the confidential data carriers in the interior of the mobile disintegration device with the disintegration fluid so as to produce a suspension of defibrated documents and disintegration fluid through a hydromechanical disintegration of the confidential data carriers, the circulation device disintegrating the confidential data carriers into fibers during transport so as to render the confidential data carriers unreadable and therefore destroyed; and
- a dewatering device separating part of the disintegration fluid out of the suspension so as to increase the density of the suspension after the confidential data carriers have been disintegrated into fibers.

21. The mobile disintegration device according to claim 20, wherein the loading device electronically opens an electromechanically operated closure mechanism of the security collection containers, and directly transfers the confidential data carriers from the security collection containers into the interior of the mobile disintegration device without allowing access to unauthorised persons, the closure mechanism securing the security collection containers so as to prevent access to the confidential data carriers collected in the security collection containers.

* * * * *